United States Patent
MacLachlan

(10) Patent No.: US 10,399,781 B2
(45) Date of Patent: Sep. 3, 2019

(54) CONVEYOR BELTS WITH LONG DRIVE PITCH

(71) Applicant: Laitram, L.L.C., Harahan, LA (US)

(72) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/070,728

(22) PCT Filed: Jan. 31, 2017

(86) PCT No.: PCT/US2017/015841
§ 371 (c)(1),
(2) Date: Jul. 17, 2018

(87) PCT Pub. No.: WO2017/139137
PCT Pub. Date: Aug. 17, 2017

(65) Prior Publication Data
US 2019/0055088 A1    Feb. 21, 2019

Related U.S. Application Data

(60) Provisional application No. 62/293,395, filed on Feb. 10, 2016.

(51) Int. Cl.
*B65G 17/08* (2006.01)
*B65G 23/06* (2006.01)

(52) U.S. Cl.
CPC ............ *B65G 17/08* (2013.01); *B65G 23/06* (2013.01)

(58) Field of Classification Search
None
See application file for complete search history.

(56) References Cited

U.S. PATENT DOCUMENTS

| | | |
|---|---|---|
| 4,556,142 A | 12/1985 | Lapeyre |
| 5,083,659 A | 1/1992 | Bode et al. |
| 5,156,262 A | 10/1992 | Horton |
| 8,496,105 B2 | 7/2013 | MacLachlan et al. |
| 9,073,694 B2 * | 7/2015 | Ozaki .................... B65G 17/08 |
| 9,475,642 B2 * | 10/2016 | Messick, Jr. ......... B65G 17/083 |
| 2016/0332821 A1 | 11/2016 | van den Berg et al. |

\* cited by examiner

*Primary Examiner* — Kavel Singh
(74) *Attorney, Agent, or Firm* — James T. Cronvich

(57) ABSTRACT

A conveyor comprising a modular belt constructed of rows of belt modules in which only alternate rows are engaged by the teeth of a drive sprocket. Alternate belt rows have drive recesses for receiving the sprocket teeth. The belt rows not engaged by the sprocket are devoid of drive pockets.

15 Claims, 3 Drawing Sheets

CONVEYOR BELTS WITH LONG DRIVE PITCH

BACKGROUND

The invention relates generally to power-driven conveyors and in particular to belt conveyors that have a drive pitch longer than the belt's articulation pitch.

Modular conveyor belts are constructed of rows of belt modules linked together at hinge joints. Conventionally, each belt row has one or more drive surfaces engaged by drive faces—e.g., teeth on the peripheries of sprockets. The spacing of consecutive hinge joints defines the belt pitch. The spacing of consecutive drive surfaces defines the belt's drive pitch. Usually the belt pitch and the drive pitch are equal. For small-pitch belts driven on each row, the thickness of the teeth has to be small. But, because thin teeth lack material, they are highly subject to wear. As the thin teeth wear, they weaken and then fail.

SUMMARY

One version of a conveyor embodying features of the invention comprises a conveyor belt constructed of first rows of first belt modules and second rows of second belt modules. The first rows and the second rows are alternately connected to each other in series at hinge joints between consecutive first and second rows. A sprocket has teeth that engage the first rows of first belt modules and not the second rows of second belt modules.

Another version of a conveyor embodying features of the invention comprises a conveyor belt constructed of a series of rows of belt modules linked together at hinge joints between consecutive rows. The hinge joints have hinge axes spaced apart in a direction of belt travel by a distance defining the belt pitch. A sprocket has teeth that engage every other row of belt modules. The circumferential spacing of the teeth defines the drive pitch, which, in this case, is twice the belt pitch.

In another aspect a modular conveyor belt embodying features of the invention comprises a plurality of first rows of first belt modules and a plurality of second rows of second belt modules. The first rows and the second rows are alternately connected to each other at hinge joints between consecutive first and second rows. Each of the first rows has a drive face for receiving a drive tooth, and all the second rows are devoid of drive faces.

DETAILED DESCRIPTION

Figure 1:
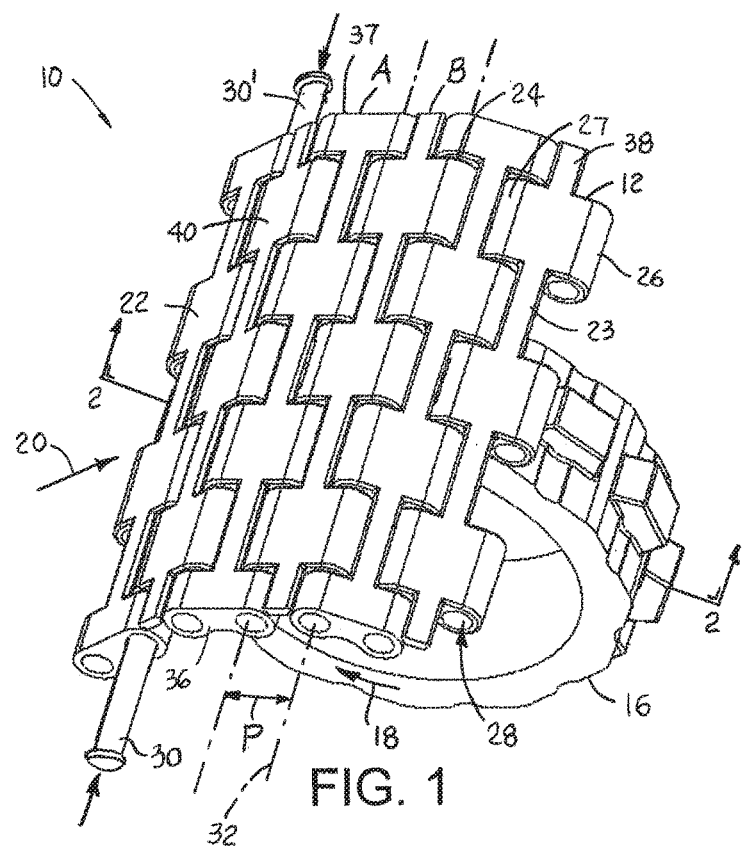
FIG. 1 is an axonometric view of a portion of a conveyor embodying the features of the invention.
Figure 2:
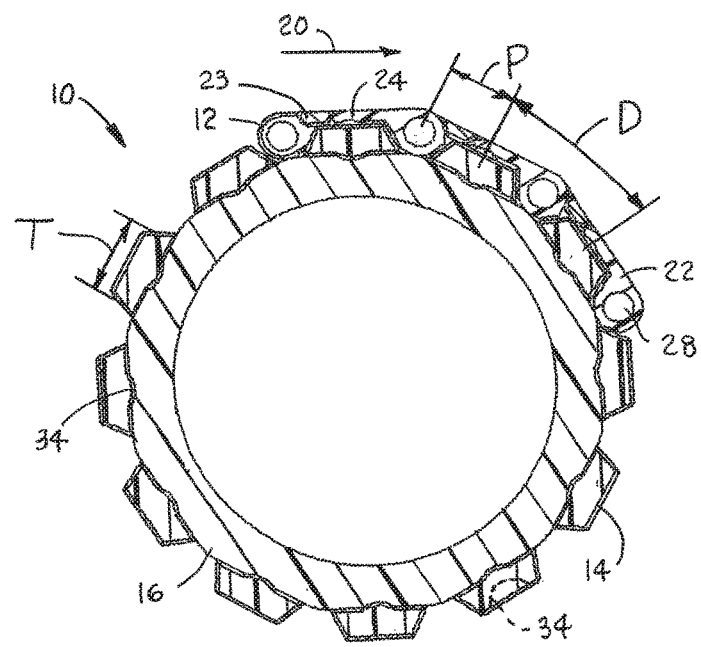
FIG. 2 is a cutaway side view of the conveyor of FIG. 1 taken along lines 2-2.

A portion of a conveyor embodying features of the invention is shown in FIGS. 1 and 2. The conveyor 18 comprises a modular conveyor belt 12 engaged by teeth 14 on the periphery of a sprocket 16. The sprocket shown is a drive sprocket rotated by a motor-driven shaft (not shown) in a clockwise direction of rotation 18 to advance the conveyor belt 12 in a direction of belt travel 20. The modular conveyor belt 12 is constructed of a series of rows A, B of belt modules 22, 23. In this version each row is composed of a single belt module. But each row could be constructed of multiple side-by-side modules arranged with the modules in consecutive rows in a bricklay fashion. The A rows alternate with the B rows. Consecutive rows are joined at hinge joints 24. Leading link ends 26 along each row interleave with trailing link ends 27 of a leading row. Holes 28 through the interleaved link ends 26, 27 are aligned to form a lateral passageway for a hinge rod 30 to connect consecutive rows together at the hinge joints 24. The hinge joints 24 define hinge axes 32 about which the modules 22, 23 articulate. The distance between consecutive hinge axes 32 is the belt pitch P.

The teeth 14 on the periphery of the sprocket 16 engage every other belt row—in this case, belt row B. Belt row A is not engaged by the sprocket teeth 14. As shown in FIG. 2, the circumferential spacing of the teeth 14 on the periphery of the sprocket defines the sprocket, or drive, pitch D. Because the teeth 14 engage only every other row, the drive pitch is twice the belt pitch P. This allows the thickness T of the teeth 14 to be greater than if they had to drive every belt row. The thick teeth 14 are stronger and more durable than thin teeth.

The thicker teeth 14 intersect a portion of every other lateral hinge rod passageway. So two hinge rods 30, 30', each entering an opposite side of the belt 12, extend laterally from the sides to positions just short of the teeth to connect the rows together. As an alternative, a single full-length hinge rod that extends all the way across the width of the belt can be used if a recess 34 is formed in the tops of each of the teeth 14, as shown in FIG. 2 on one of the teeth. The lateral recess 34 provides clearance for the full-length hinge rod.

As shown in FIG. 1, the A rows differ from the alternate B rows. For example, the side edges 36, 37 of the A rows are thickened and form the majority of the side edges of the belt 12. The B rows, on the other hand, terminate at their side edges in small stubs 38 that fit into the spaces between the side edges 36, 37 of the A rows. The two sets of rows A, B are shaped complementarily to provide the belt 12 with a closed conveying surface 40, except for the seams between adjacent belt modules.

Figure 3A:
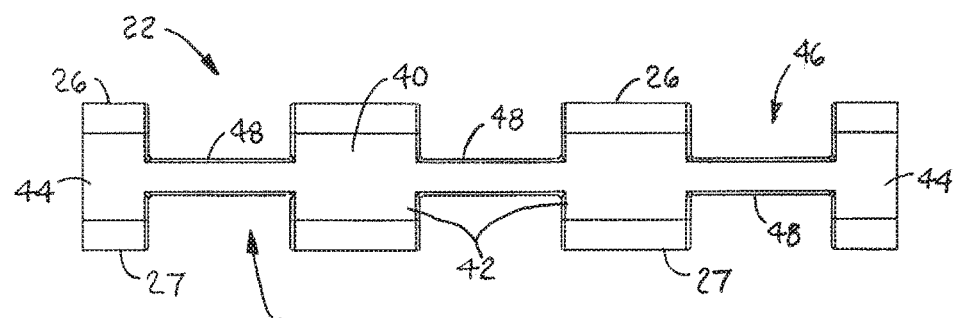
FIG. 3A is a top plan view of a belt module without drive pockets that is used to construct a belt as in FIG. 1.
Figure 3B:
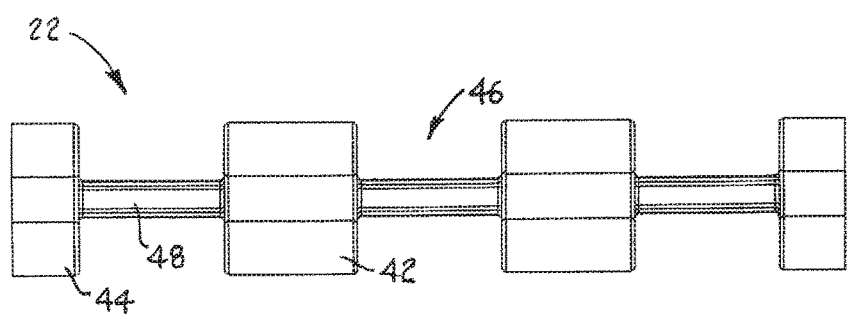
FIG. 3B is a bottom plan view of the belt module of FIG. 3A.

A single-module A row is shown in more detail in FIGS. 3A and 3B. The A-row module 22 comprises two interior links 42 and two outer links 44—the side-edge pieces 36, 37, of FIG. 1. The links 42, 44 terminate in the leading and trailing link ends 26, 27. The links 42, 44 are spaced from each other by gaps 46. Narrow bridges 48 extend from the sides of the links 42, 44 laterally across the gaps 46 between the link ends 26, 27. The tops of the bridges 48 and the tops of the links 42, 44 form the conveying surface 40 of the belt 12 as in FIG. 1. As seen from the bottom side of the A-row module 22 in FIG. 3B, the interior links 42 are devoid of drive pockets that receive sprocket teeth. FIG. 3B also shows that the bridges 48 are thin webs connected between consecutive links 42, 44 without extending deeply into the gaps 46 toward the undersides of the module 22.

Figure 4A:
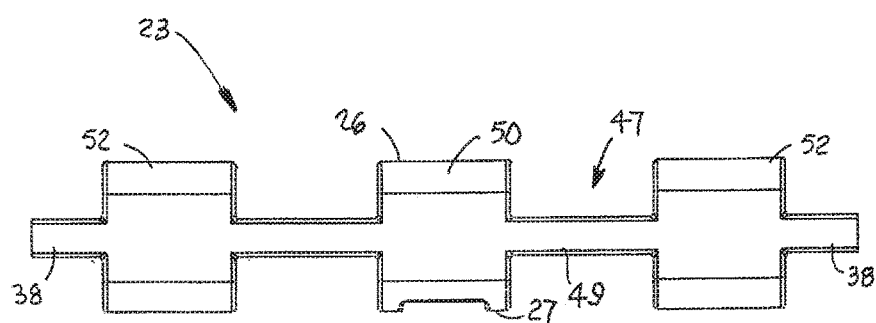
FIG. 4A is a top plan view of a belt module with a drive pocket for constructing a belt as in FIG. 1.
Figure 4B:
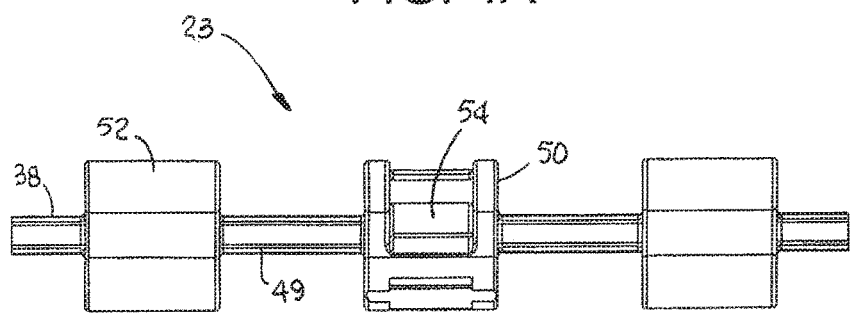
FIG. 4B is a bottom plan view of the belt module of FIG. 4A.

A complementary single-module B row is shown in FIGS. 4A and 4B. The module 23 is shown with one interior link 50 and two outer links 52 joined across gaps 47 by bridges 49. The edge stubs 38 extend laterally outward from the outer sides of the outer links 52. The stubs 38 are essentially extensions of the bridges 49. Like the bridges 48 in the A-row modules 22, the bridges 49 and stubs 38 in the B-row modules 23 are thin and extend laterally across gaps 47 between consecutive links 50, 52. As shown in FIG. 4B, the interior link 50 has a drive pocket 54 recessed into its underside. The drive pocket 54 receives the sprocket teeth 14 (FIG. 2). As shown in FIG. 1 and is clear from FIGS. 3A and 4A, the A-row modules 22 interfit with the B-row modules 23 to form a closed-area belt 12. The links 42, 44 of the A-row modules 22 are laterally offset from the links 50, 52 of the B-row modules 23 so that their leading and trailing link ends 26, 27 fit in the gaps 46, 47 of consecutive rows. The interleaved link ends 26, 27 of consecutive rows then form the aligned passageways for the hinge rods. The A-row links 42, 44 are arranged in longitudinal lanes of links separated by the B-row bridges 49. And the B-row links 50, 52 are similarly arranged in longitudinal lanes of links separated by the A-row bridges 48.

Figure 5:
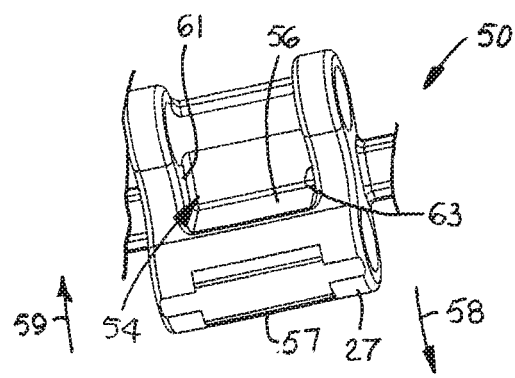
FIG. 5 is an enlarged view of the underside of a belt module as in FIG. 4B showing details of the drive pocket.

Further details of the drive pocket 54 of the B-row link 50 are shown in FIG. 5. The drive pocket has an inner drive face 56 against which a drive-sprocket tooth pushes to move the belt in the forward direction 58. When the direction of belt travel is reversed, the drive-sprocket tooth engages an outer drive face 57 on the next consecutive B-row module to move the belt in the reverse direction 59. The link end 27 has both drive faces: the inner drive face 56 bounding the drive pocket 54 and the outer drive face 57 bounding the drive pocket of the next consecutive B-row link. The drive pocket 54 has three walls. The forward (or rearward) wall is formed by the inner drive face 56. Two parallel side walls 61, 63 extend from the forward wall 56 to flank the three-sided pocket 54, which is closed on the fourth side by the outer drive face 57 of the neighboring B-row link end.

Figure 6:
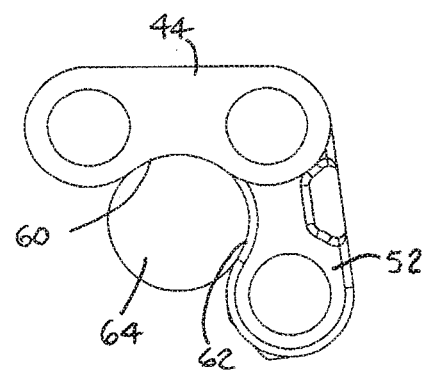
FIG. 6 is a side elevation view of a portion of the belt of FIG. 1 going around a small-diameter nosebar.

As shown in FIG. 6, the bottoms 60, 62 of the B-row links 50, 52 and the A-row links 42, 44 are concavely scalloped to allow the conveyor belt to articulate around a small-diameter nose bar 64 for tight product transfers off the end of a belt run.

The belt modules described can be made of various materials, but would most commonly be injection-molded out of a thermoplastic material. The belt modules can be made with a very small belt pitch, such as 8 mm or less.

Although the invention has been described in detail with reference to a specific version, other versions are possible. For example, the non-driven belt rows could have drive pockets that are not used for engagement with sprocket teeth. Alternatively, the drive pockets could be formed in the A rows and not the B rows, the A rows engaging the sprocket teeth instead. As another example, the drive faces could extend downward from the undersides of the sprocket-engaging modules to form a male drive element on the belt rather than a female receptacle. In that case the sprocket would have a female recess engaging male drive faces on the belt.

What is claimed is:

1. A conveyor comprising:
   a conveyor belt constructed of a plurality of first rows of first belt modules and a plurality of second rows of second belt modules wherein the first rows and the second rows extend across the width of the conveyor belt from a first side edge to a second side edge and are alternately connected to each other in series at hinge joints between consecutive first and second rows;
   a sprocket having teeth engaging the first rows of first belt modules and not the second rows of second belt modules.

2. A conveyor as in claim 1 wherein the first rows of first belt modules engaged by the teeth of the sprocket have drive pockets receiving the teeth.

3. A conveyor as in claim 2 wherein the second rows of second belt modules not engaged by the teeth of the sprocket are devoid of drive pockets.

4. A modular conveyor belt comprising:
   a plurality of first rows of first belt modules and a plurality of second rows of second belt modules wherein the first rows and the second rows extend across the width of the conveyor belt from a first side edge to a second side edge and are alternately connected to each other at hinge joints between consecutive first and second rows;
   wherein each of the first rows has a drive face for receiving a drive tooth and wherein all the second rows are devoid of drive faces.

5. A modular conveyor belt as in claim 4 wherein the first rows of first belt modules and the second rows of second belt modules each comprise:
   a plurality of links extending in a direction of belt travel from a first link end to a second link end and separated by gaps between facing sides of consecutive links;
   a plurality of bridges extending between facing sides of consecutive links across the gaps between the first link ends and the second link ends.

6. A modular conveyor belt as in claim 5 further comprising a drive pocket formed in one of the links in each of the first rows and bounded by the drive face to receive a drive tooth.

7. A modular conveyor belt as in claim 6 wherein the drive pocket is bounded by the second link end of the link at one end of the drive pocket and by the second link end of the next consecutive link at the other end.

8. A modular conveyor belt as in claim 5 wherein the links and the bridges form a closed conveying surface on each belt module in each row.

9. A modular conveyor belt as in claim 5 wherein the bridges are equidistant from the first and second link ends.

10. A conveyor comprising:
    a conveyor belt constructed of a series of rows of belt modules linked together at hinge joints between consecutive rows, wherein the hinge joints have hinge axes spaced apart in a direction of belt travel by a distance defining the belt pitch;
    a sprocket having teeth engaging every other row of belt modules, wherein the circumferential spacing of the teeth defines the drive pitch; and
    wherein the drive pitch is twice the belt pitch.

11. A conveyor as in claim 10 wherein every other row of belt modules includes at least one drive face engaging the teeth of the sprocket.

12. A conveyor as in claim 10 wherein every other row of belt modules includes at least one drive pocket receiving the teeth of the sprocket.

13. A conveyor as in claim 10 wherein the belt modules comprise:
    a plurality of links extending in a direction of belt travel from a first link end to a second link end and separated by gaps between facing outer sides of consecutive links across the width of the belt row;

a plurality of bridges extending between the facing outer sides of consecutive links across the gaps between the first link end and the second link end.

14. A conveyor as in claim 13 further comprising a drive pocket formed in one of the links in every other row and bounded by a drive face engaged by the teeth of the sprocket.

15. A conveyor as in claim 13 wherein the links and the bridges form a closed conveying surface.

* * * * *